Feb. 15, 1938.  P. HIRSCH ET AL  2,108,714
PIPE COUPLING
Filed Sept. 22, 1936
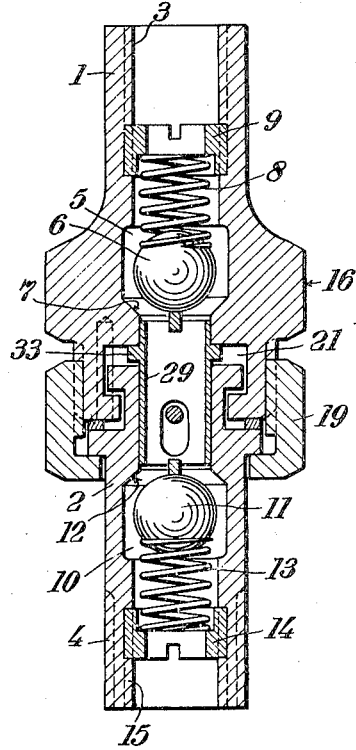
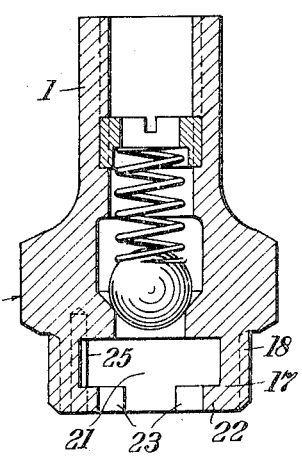
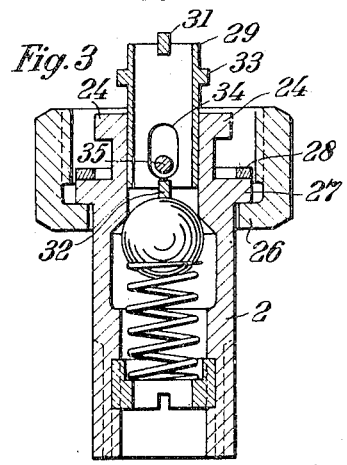
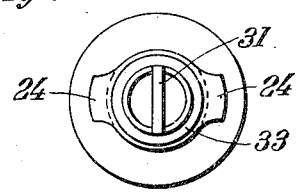
Inventor:
P. Hirsch & R. Kaiser
By Glascock Downing & Seebold
Attys.

Patented Feb. 15, 1938

2,108,714

UNITED STATES PATENT OFFICE 2,108,714

PIPE COUPLING

Peter Hirsch and Rudolf Kaiser, Berlin-Reinickendorf, Germany

Application September 22, 1936, Serial No. 102,023
In Germany September 28, 1935

5 Claims. (Cl. 284—18)

REISSUED
DEC 23 1941

This invention relates to a pipe coupling.

When a pipe connection which connects a filled pipe system with another system or a pressure generator or the like is to be temporarily disconnected, this provides certain difficulties, if the disconnection is to be made rapidly and without any appreciable loss of the medium (liquid, gas or the like) contained in the pipe-line. In the pipe systems, in which the medium to be conveyed is a liquid, and is to transmit power or work, there is the further difficulty, that, on disconnecting the pipe connection and re-establishing the connection, care must be taken that no air may enter the system. Such conditions pertain, for instance, in the case of the fluid brakes of vehicle wheels. When the brake is rigidly connected with the wheel, it is necessary each time a wheel is removed to release the pipe connection as well, which connects the brake pipe system with the brake.

All the above requirements are fulfilled by the coupling according to the invention, through each coupling part having an automatically acting valve which is kept open in a positive manner, when the coupling is closed, but closes, when the coupling is released.

Other characteristic features and advantages of the invention will appear in the following specification in which a constructional example is described with reference to the accompanying drawing, in which Fig. 1 shows a cross-section through the coupling according to the invention in the coupled state;

Fig. 2 a cross-section similar to Fig. 1, but through one coupling part in the uncoupled state;

Fig. 3 is a cross-section similar to Fig. 2 through the other coupling part;

Fig. 4 is a plan view of detail.

The coupling according to the invention consists of a socket-like part 1 and a spiggot-like part 2, which are fixed to the ends of the pipes to be connected, which are not shown. Fixing can for instance be effected by means of the internal thread 3 provided in the coupling part 1 and with the coupling part 2 by means of the external thread 4.

The coupling part 1 has a chamber 5 for the reception of the ball 6. 7 is the seating surface for the ball, which co-acts with the ball and, on the ball bearing against it, provides a tight closure. The ball is under the influence of a compression spring 8 which is held by means of a nut 9 screwed into the internal thread 3. Similarly, in the coupling part 2 there is a chamber 10 with a ball 11, the seating surface 12 for the latter, the compression spring 13 and a nut 14 which is screwed into the internal thread 15.

The connection of the two coupling parts 1 and 2 is effected as follows:—

The coupling part 1 is provided with an engagement surface 16 which allows of the coupling part being held to prevent turning, for instance by means of a spanner, a clamp or the like. In the example shown, this engagement surface 16 is formed as a hexagon, but in some circumstances a fluted cylindrical surface will suffice. Below this surface 16 the coupling part 1 is provided with an extension 17, (Fig. 2) which has an external thread 18 for screwing on the cap nut 19. The space within the coupling part 1 widens out behind the valve seating 7, so as to form a chamber 21, the purpose of which will be described below. The extension 17 is made of somewhat smaller diameter at its lower end, so that an annular flange 22 is formed. In this flange two oppositely disposed slots 23 are provided, for the bayonet-like engagement of the lateral projections 24 at the end of the coupling part 2. When the coupling part 1 (Fig. 2) is to be connected with the coupling part 2 (Fig. 3), the part 1 is held at the periphery 16 to prevent it turning, for instance by means of a spanner. The projections 24 of the coupling part 2 are pushed into the bayonet catch 23 and are turned in the chamber 21 until the stop 25 is reached, which is a pin introduced into a bore in the coupling part 1. The cap nut 19 is then screwed on to the thread 18, engaging by means of its bottom internal flange 26 in the external flange 27 of the part 2 and pressing part 2 against the part 1. On the surface of the external flange 27 which faces the coupling part 1, a packing ring 28 is provided.

In Figs. 2 and 3 is shown that, when the coupling is released, the balls will bear on their seatings under the pressure of their associated springs, so that the two pipes are closed to the outside.

On the two coupling parts being connected, the balls are lifted from their seatings. For this purpose a small tubular piece 29 is inserted into the end of the opening of the coupling part 2, which is behind the ball chamber 10 of the latter. This tubular piece 29 has two bridges 31 and 32, which, when the two coupling parts are united, lift the two balls from their seatings and hold them in this position, as shown in Figure 1. As the stressing of the springs 8 and 13 may be different or as there may be pressure differences in the pipes behind the coupling parts 1 and 2, the tubular piece 29 might be displaced by one ball or the other in the axial direction, which might lead to one of the valves closing, if safety means for preventing this were not provided. These safety means consist in an outer ring flange 33 which, as shown in Fig. 1, can bear, or bears, on the one hand against an internal surface of the coupling part 1, in the chamber 21, and on the other hand against the end edge of the flange 24 of the coupling part 2.

On the two coupling parts being separated, the tubular piece 29 will be displaced under the pressure of the ball 11, as its bridge 31 is no longer under the pressure of the ball 6, towards the bridge 32. In order to prevent the tubular piece from falling out altogether, its cylindrical surface is slotted at 34 and in this slot there engages a pin 35 provided in the coupling part 2.

In the coupled state, (Fig. 1), the two balls are therefore lifted off their seatings 7 and 12. As, when the cap nut 19 is gradually released, the packing 28 is loosened, but the balls 6 and 11 are still lifted off their seatings, liquid from the pipe might leak out over the packing 28. In order to prevent this, the tubular piece 29 is accurately fitted in the ends of the coupling parts 1 and 2.

The coupling according to the invention has proved its usefulness and its reliability in operation. It is particularly suitable in all cases where a filled pipe system has to be temporarily separated from another pipe system or from a power generator or the like, without any substantial loss of liquid.

In the case of the road wheels of vehicles, for instance, which are provided with a fluid brake, the removal of the brake, for instance, when the latter is connected to the wheel, provides difficulties, because, after re-mounting, the whole of the brake system had to be re-mounted or freshly filled. With a coupling according to the invention, however, the wheel with the brake can be quickly removed and replaced. Appreciable fluid losses or appreciable quantities of air entering the brake system need not be feared.

What we claim is:

1. A pipe coupling comprising two coupling parts, in each coupling part a valve, means for keeping the valves closed, when the coupling is disconnected, a tubular piece overlapping both ends of the coupling parts and disposed between the two valves for keeping the valves open, when the coupling is connected, and a flange on the tubular piece, adapted to bear against the ends of the coupling parts for securing them against axial displacement.

2. The device as claimed in claim 1 in which the tubular piece is located between the two valves and the means for fixing said tubular piece in position is a flange thereon adapted to bear against the ends of the axial part.

3. The device as claimed in claim 1 in which the tubular piece is located between the two valves and the means for fixing said tubular piece in position is a flange thereon adapted to bear against the ends of the axial part, and means in one of said coupling parts to retain said tubular piece therein when the coupling is disconnected.

4. The device as claimed in claim 1 in which the tubular piece is located between the two valves and the means for fixing said tubular piece in position is a flange thereon adapted to bear against the ends of the axial part, said tubular piece fitting slidingly and tightly in said coupling and adapted to act as a sealing means during the disconnecting of the coupling parts before the closing of the valves.

5. The device as claimed in claim 1 in which the tubular piece is located between the two valves and the means for fixing said tubular piece in position is a flange thereon adapted to bear against the ends of the axial part, said tubular piece fitting slidingly and tightly in said coupling and adapted to act as a sealing means during the disconnecting of the coupling parts before the closing of the valves, and in which there are further sealing means between the ends of the two coupling parts.

PETER HIRSCH.
RUDOLF KAISER.